(12) United States Patent
Yamamoto et al.

(10) Patent No.: US 6,411,894 B2
(45) Date of Patent: Jun. 25, 2002

(54) NAVIGATION DEVICE

(75) Inventors: Takeyoshi Yamamoto; Masahito Hata, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/788,576

(22) Filed: Feb. 21, 2001

Related U.S. Application Data

(63) Continuation of application No. PCT/JP99/03655, filed on Jul. 6, 1999.
(51) Int. Cl.[7] .......................... G06F 17/00; B60R 16/02
(52) U.S. Cl. ...................... 701/208; 701/208; 701/210; 701/216; 701/93; 701/213; 340/936; 340/995
(58) Field of Search ................................. 701/208, 209, 701/210, 51, 54, 55, 216, 93, 36, 361, 200, 213, 97, 96, 53; 340/995, 936, 903

(56) References Cited

U.S. PATENT DOCUMENTS 6,108,602 A    8/2000  Bairamis ................... 701/208
6,144,318 A *  11/2000 Hayashi et al. ............ 340/995
6,199,001 B1 * 3/2001  Ohta et al. .................. 701/51

FOREIGN PATENT DOCUMENTS

| JP | A6317654  | 11/1994 |
| JP | A835848   | 2/1996  |
| JP | A9142232  | 6/1997  |
| JP | A10100815 | 4/1998  |
| JP | A10236246 | 9/1998  |
| JP | A10247299 | 9/1998  |
| JP | A10313484 | 11/1998 |

* cited by examiner

Primary Examiner—William A. Cuchlinski, Jr.
Assistant Examiner—Tuan C To

(57) ABSTRACT

A navigation device includes a determination means which determines whether or not to activate tunnel mode function based on characteristic data of the tunnel read from the database, a vehicle speed detected by the vehicle speed detection means and a vehicle position detected by the vehicle position detection means, and a control means which displays characteristics of the tunnel to be travelled through on a display means based on a command signal from the determination means to activate the tunnel mode function and which activates various on-vehicle devices in the tunnel mode function.

12 Claims, 4 Drawing Sheets

○○ TUNNEL
TOTAL LENGTH ×× (m)
MAXIMUM SLOPE △△ (DEGREES)

▯ ··· FIRE EXTINGUISHER VALVE

🈲 ··· EMERGENCY EXIT

○○ TUNNEL

NAVIGATION DEVICE

CROSS-REFERENCE TO THE RELATED APPLICATION

This Application is a continuation of International Application No. PCT/JP99/03655, whose International filing date is Jul. 6, 1999, the disclosures of which Application are incorporated by reference herein.

BACKGROUND OF THE INVENTION

1. Field of the Invention

The present invention relates to a navigation device which indicates the characteristics of a tunnel on the display before entering the tunnel when a vehicle's approach to the tunnel is detected using a navigation function. The safety and comfort of the driver are maintained by displaying a precaution with respect to conditions resulting from entering the tunnel.

2. Description of the Related Art

FIG. 1 shows a conventional navigation device as disclosed for example in JP-A-10-100815. The navigation device is adapted to detect a vehicle's approach to a tunnel and activate various on-vehicle devices in a tunnel mode function on the basis of the detected signal.

In FIG. 1, reference numeral 1 denotes a navigation computer means with a database (not shown). Map data is stored in the database, the map data includes data on the accurate position of tunnels as well as data on a road network, which can be travelled on by the vehicle, and the road network surroundings.

Reference numeral 2 is a GPS antenna, 3 is a vehicle position detection means, 4 is a control means which controls the operation of the on-vehicle devices based on the output signal from the navigation computer means 1. Reference numeral 5 is a window operation means provided with a motor, 6 is a headlight control means, 7 is a sunroof operation means, 8 is an air conditioner switching means which switches an air circulation mode, 9 is a manual tunnel switch for controlling the activation of each means manually based on the display command from the control means 4 with respect to the tunnel mode function.

Next, the operation of the conventional navigation device will be described.

The navigation computer means 1 determines a vehicle position continuously on a road network on the basis of a GPS satellite signal from a GPS antenna and an output signal of the vehicle position detection means 3. From the continuously obtained position, the navigation computer means 1 confirms whether the vehicle is currently traveling inside or outside a tunnel on a searched route. If the vehicle is currently inside a tunnel, the navigation computer means 1 confirms whether the vehicle has just entered the tunnel or has just finished travelling through the tunnel.

When it is determined that the vehicle is about to enter the tunnel, an appropriate message signal is transmitted to the control means 4. The control means 4 selects on-vehicle devices to be activated in a tunnel mode function in response to the transmitted signal and automatically activates the tunnel mode function. Alternatively, a display suggesting operation of the manual tunnel switch 9 is performed. A driver operates the manual tunnel switch 9 based on this display and various types of on-vehicle equipment are activated in the tunnel mode function.

For example, such a tunnel mode function includes, (1) Closing the windows by activation of the window operation means 5, (2) Closing the sunroof by activation of the sunroof operation means 7, (3) Activating the headlight control means 6 to lower the beam of the headlights for example, (4) Placing the air-conditioner in air recirculation mode by activation of the air-conditioner switching means 8, (5) Switching over an audio system from radio reception mode to recorded medium mode.

Since the conventional navigation device is constructed as the above, on-vehicle devices are activated in a tunnel mode function or are placed in an operable state for the tunnel mode function if it is confirmed that a vehicle will enter a tunnel on a currently traveled searched route. However, for example even in those cases when the tunnel is short and it is not necessarily required to activate the tunnel mode function or place the on-vehicle devices in an operable state for the tunnel mode function, various on-vehicle devices are switched intermittently between the tunnel mode and the other modes. Thus, the possibility exists that the durability of the on-vehicle devices will be reduced as a result of the frequent switching operation.

Furthermore, the problem has arisen that even when the tunnel mode function is activated, since information such as the length of the tunnel, lane number, presence of traffic signals in the tunnel is not known, the driver has to enter the tunnel in a tense, uneasy state. In particular, if the inside of the tunnel is sloping and the road extends in a descending slope towards the tunnel exit, vehicle speed will naturally increase. Furthermore, when the road curves at the tunnel exit, the possibility exists of dangerous conditions.

SUMMARY OF THE INVENTION

The present invention is proposed to solve the above problems and has the object of providing a navigation device which performs a precautionary function by informing characteristics of a tunnel to a driver before entering the tunnel when a vehicle encounters a tunnel. Such characteristics include for example, the name of the tunnel, the shape of the tunnel (length, height, width, presence of curves), the lane number, and the presence of traffic lights or the like.

The navigation device according to the present invention comprises: a vehicle position detection means for detecting a vehicle position; a vehicle speed detection means for detecting a vehicle speed; a determination means provided with a database which records data on a currently traveled route network, data on the surroundings thereof, and characteristic data relating to tunnels on the route network, the determination means determining whether or not to activate a tunnel mode function on the basis of the characteristic data relating to the tunnel read from the database, the vehicle speed detected by the vehicle speed detection means and the vehicle position detected by the vehicle position detection means; and a control means for displaying characteristics of the tunnel to be travelled through on a display means based on a command signal from the determination means indicative of activation of the tunnel mode function and for activating each on-vehicle device in the tunnel mode function or suggesting activation of the tunnel mode function.

In this way, when a vehicle approaches a tunnel, the characteristics of the tunnel are indicated on the display section of the navigation device and it is possible to comprehend the characteristic conditions of the tunnel beforehand. As a result, the decisions whether to illuminate headlights, turn off wipers, close windows, and switch the air-conditioner to air recirculation mode can be performed with a degree of ease. Thus, driving comfort and driving safety are increased.

Further, the navigation device of the present invention is adapted to determine whether to activate a tunnel mode function in consideration of the vehicle speed and the displayed information about the tunnel, and to automatically activate various on-vehicle devices in the tunnel mode function or display the suggestion to activate the tunnel mode function in order to instruct a driver to operate the manual tunnel switch. As a result, it is possible to avoid unnecessary mode switching in comparison with the conventional navigation device which switches the mode of the on-vehicle devices on each occasion to enter a tunnel. Therefore, damage due to frequent mode switching of various on-vehicle devices can be reduced The navigation device of the present invention may be adapted to display a longitudinal sectional view of the tunnel through which the vehicle will travel on a display section of the navigation means when the tunnel mode function is activated.

In such a way, it is possible to indicate a slope of the road in the tunnel. Thus, it is possible to drive according to the road conditions, as a result, driving safety can be improved.

The navigation device of the present invention may be adapted to display characteristic information relating to the tunnel through which the vehicle will travel on a display section of the navigation means.

In such a way, it is possible to indicate tunnel conditions to the driver beforehand. Therefore, it is possible to improve driving safety and comfort as a result of the extra time allowed for determining required actions.

Furthermore, the navigation device of the present invention is adapted to calculate a distance to a tunnel based on a vehicle speed detected by a vehicle speed detection means when the vehicle lies within a link area in map data on which the tunnel exists. When the distance is within a fixed value, characteristics relating to the tunnel through which the vehicle will travel are displayed on the display section of the navigation means.

In such a way, it is possible to perform display of tunnel characteristics in an appropriate timeframe in consideration of vehicle speed.

The navigation device of the present invention may be adapted to determine whether or not to guide a tunnel based on the tunnel length and an average vehicle speed before entering the tunnel.

In such a way, it is possible to prevent unnecessary tunnel guiding.

DETAILED DESCRIPTION OF THE PREFERRED EMBODIMENTS

In order to describe the invention is greater detail, the preferred embodiments of the invention will be described below with reference to the accompanying drawings.

Embodiment 1

Figure 1:
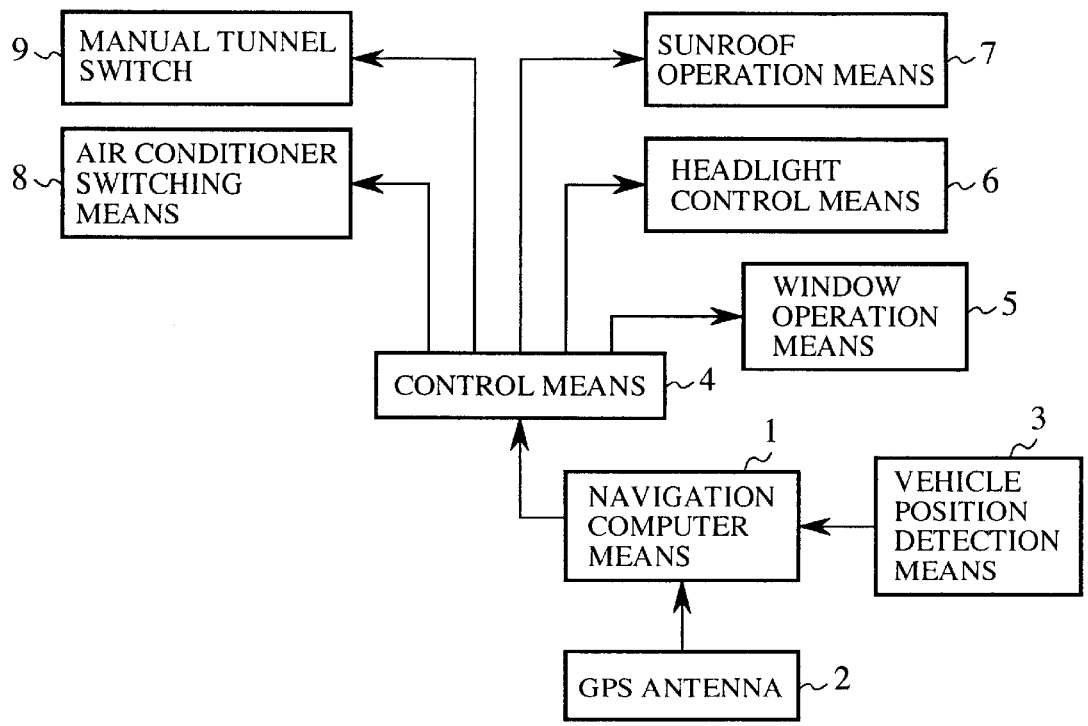
FIG. 1 is a block diagram showing the state in which a conventional navigation device is used.
Figure 2:
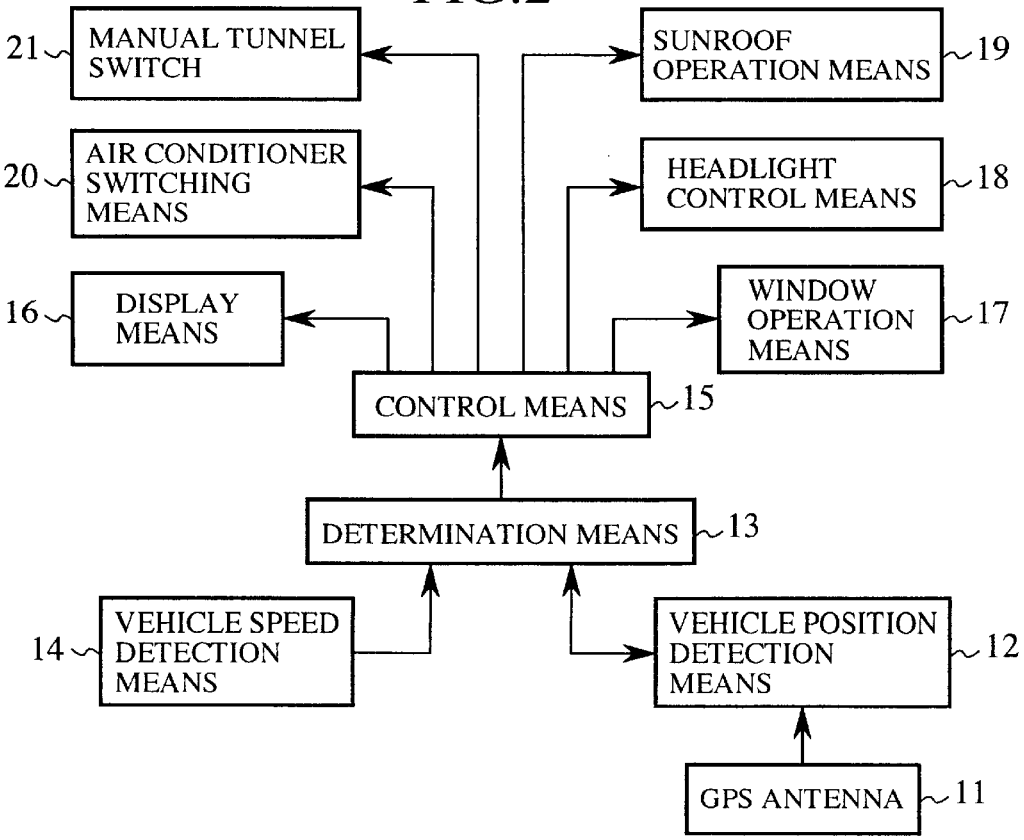
FIG. 2 is a block diagram showing the state in which a navigation device according to the present invention is used.

FIG. 2 is a block diagram schematically showing the configuration of a navigation device according to a first embodiment of the present invention. In the figure, reference numeral 11 denotes a GPS antenna, 12 is an automatic vehicle position detection means which detects a vehicle position based on a received signal from the GPS antenna 11. Reference numeral 13 is a determination means which has a database which stores data on a currently traveled route network, data on the surroundings thereof, and the characteristic data relating to tunnels on a route network. The determination means 13 determines whether or not to activate a tunnel mode function based on the characteristic data relating to the tunnel read from the database, the vehicle speed detected by the vehicle speed detection means 14 and the vehicle position detected by the vehicle position detection means 12.

Figure 4:
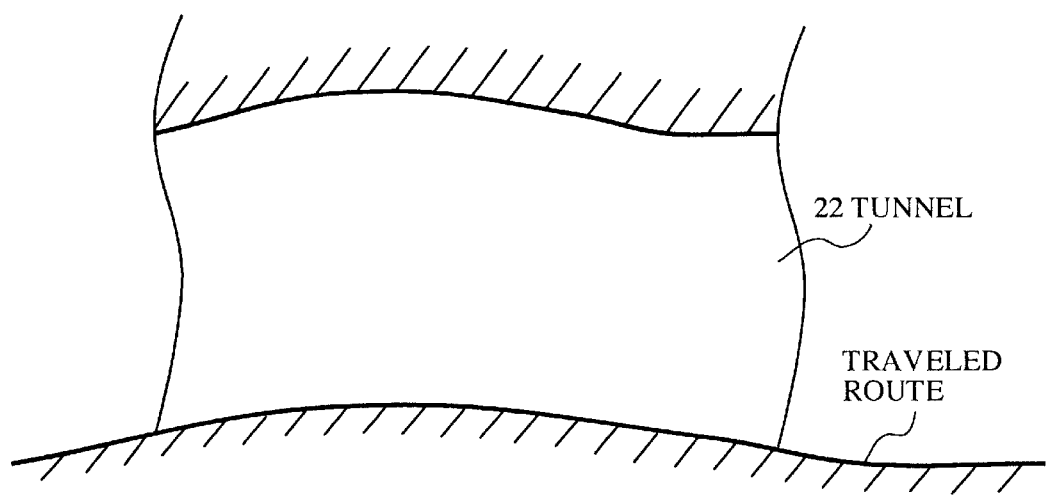
FIG. 4 is a longitudinal section of a tunnel displayed when in tunnel mode function.

When a vehicle approaches a tunnel, the determination of when to display the tunnel through which the vehicle will travel is performed based on the following procedure. For example, when a tunnel exists on a travel route to be displayed on a map and the vehicle enters the link area on which the tunnel exists, a distance to the tunnel is calculated in consideration of the vehicle speed detected by the vehicle speed detection means. Then, if the distance is not more than a pre-set fixed value, characteristics of the tunnel and a longitudinal section of the tunnel 22 in the direction of travel as shown in FIG. 4 are displayed. The tunnel characteristics include, for example, the name of the tunnel, the shape of the tunnel (height, width, length, presence of curves), the lane number in the tunnel, the presence of a plurality of tunnels in a short distance (hereafter this is termed "continuous tunnel", that is to say, when there is a single short tunnel, the possibility exists that it is not necessary to switch to a tunnel mode function and when a plurality of tunnels continues, it will be often the case that the device should be switched to the tunnel mode function), the presence of traffic lights in the tunnel or the like. In addition, sudden information related to traffic congestion and the presence of traffic restrictions is displayed on the display means 16.

Figure 5:
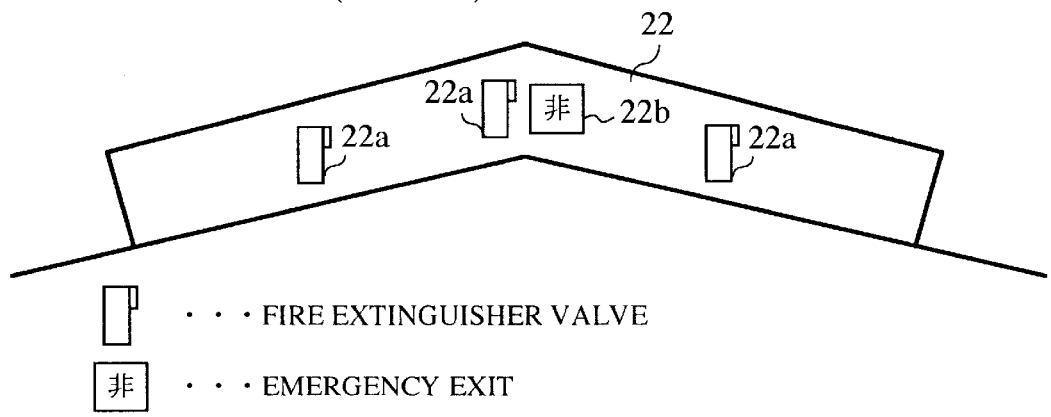
FIG. 5 shows the state in a tunnel.

Apart from the longitudinal cross section of the tunnel as shown in FIG. 4, the position of fire extinguishing valves 22a, the position of emergency exits 22b as well as the maximum angle of slope, the length and name of the tunnel may be added as shown in FIG. 5.

Figure 6:
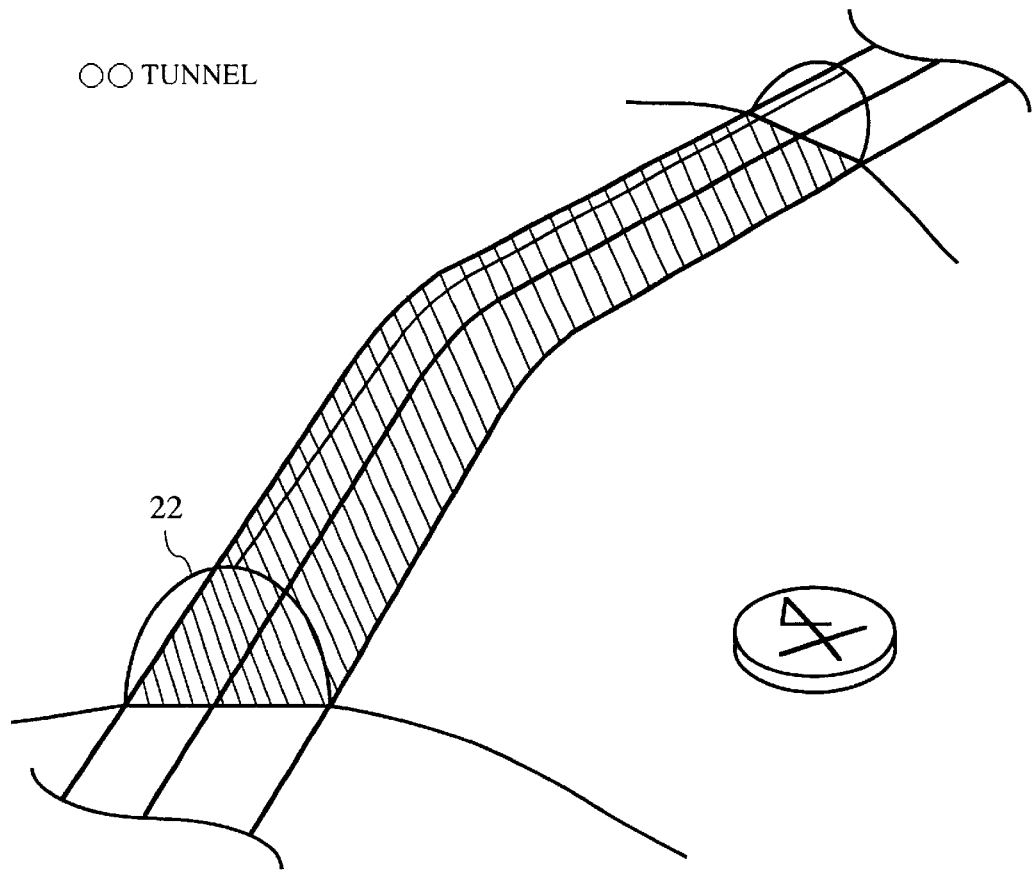
FIG. 6 shows a tunnel in three dimensions.

Further, as shown in FIG. 6, the tunnel may be displayed in a deformation 3-D presentation.

Furthermore, by displaying the present position of the vehicle on the tunnel map, a user can easily discern the remaining distance in the tunnel.

Reference numeral 17 denotes a window operation means which opens and closes a door window, 18 is a headlight control means which operates the beam of the headlights, 19 is a sunroof operation means which opens and closes the sunroof, 20 is an air conditioner switching means which switches an air conditioner mode, 21 is a manual tunnel switch which activates each means manually in the tunnel mode function when the activation of the tunnel mode function is displayed by the determination of the central control means.

Next, the operation of the navigation device according to the present invention will be described.

Figure 3:
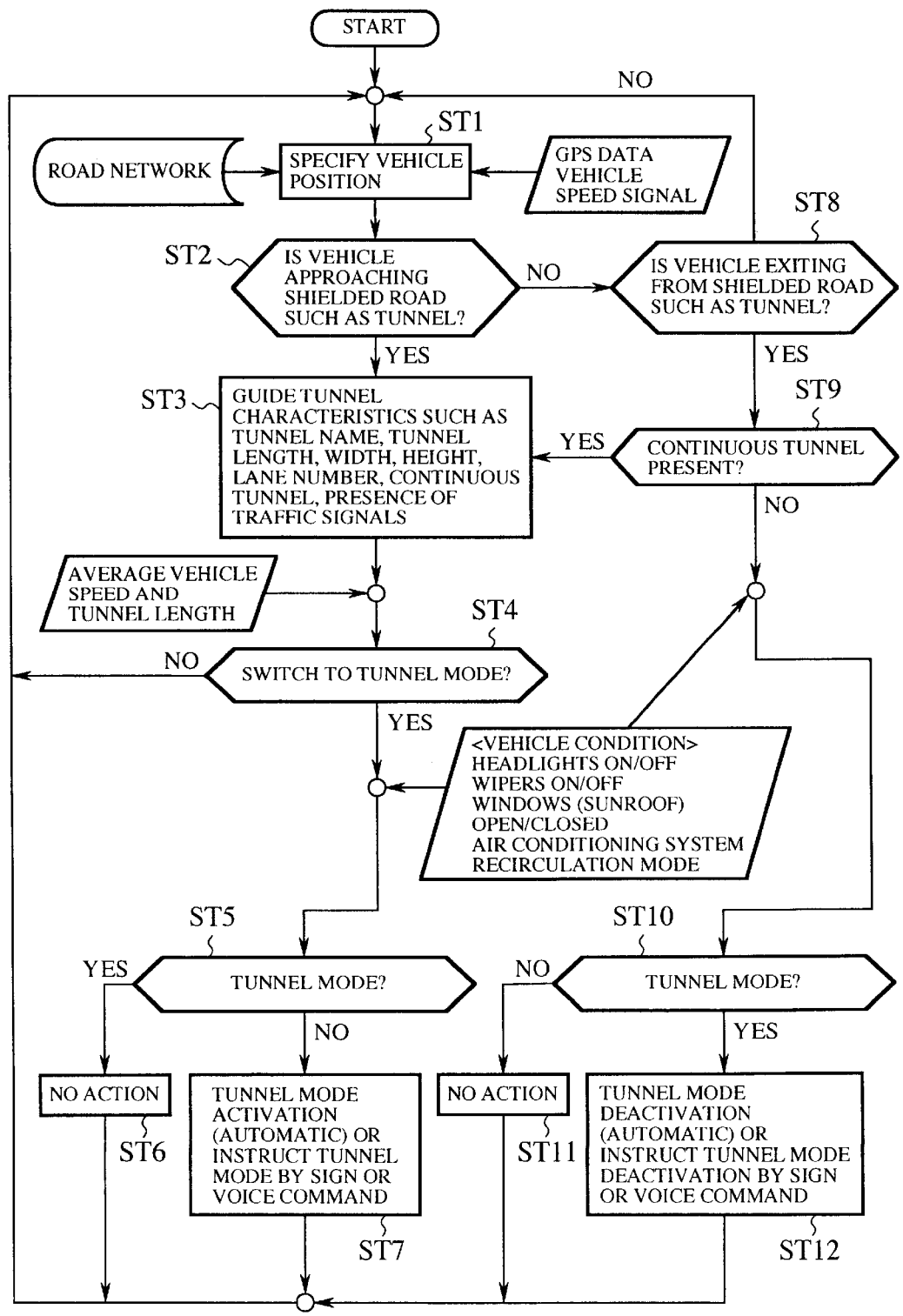
FIG. 3 is a flowchart showing the operation of the navigation device according to the present invention.

FIG. 3 is a flowchart showing the operation of the navigation device. Firstly, the vehicle position detection means 12 receives a GPS signal through the GPS antenna 11, reads data on a route network from a database and specifies a vehicle position on the route network (step ST1).

The determination means 13 determines whether a tunnel is approaching based on a signal indicative of the vehicle position specified as above and the vehicle speed detected by the vehicle detection means 14 (step ST2). If the answer is "Yes", the control means 15 receives a determination signal from the determination means 13 and displays characteristics of the tunnel on the display means 16 (step ST3). Then, it is determined whether it is necessary to switch the various on-vehicle devices to the tunnel mode function in consideration of current average vehicle speed, tunnel length and the like (step ST4).

If the result of the determination is "Yes", that is to say, when it is necessary to switch the devices to the tunnel mode function, the control means 15 effects the following operations.

(1) The state of the headlights is detected. When the state of the headlights detected is OFF, either the driver is advised to turn the headlights ON or the headlight control means 18 is activated to automatically turn the headlights ON. Further, in order to improve visibility in the tunnel for the driver, the brightness of the headlights and beam height as well as the color tone of the display may be adjusted.

(2) The state of the windows is detected and when the window are in an open position, the window operation means 17 is activated and the windows are closed.

(3) The state of the sunroof is detected and when the sunroof is in an open position, the sunroof operation means 19 is activated and the sunroof is closed.

(4) The state of the internal/external air recirculation is detected and when external air recirculation is performed before entry into a tunnel, the user is advised to switch to internal air recirculation mode or the air-conditioning switch means 20 is activated to automatically switch the air-conditioning system to internal air recirculation mode.

In addition, (5) Radio or TV stations which can be received in the tunnel are displayed so that the driver can perform tuning. Otherwise, the tuning may be automatically performed. If no stations can be received or when noise interference is severe, the device is adapted to switch automatically to other audio devices or to automatically apply a mute.

Apart from performing such switching automatically, the switching may be performed manually by operation of the manual tunnel switch 21 based on a command display indicating that switching of the various on-vehicle devices to the tunnel mode function should be performed.

Next, it is determined whether the state of the vehicle is in the tunnel mode function (step ST5). If the result of the determination is "Yes", no action is taken (step ST6). If the answer is "No", the tunnel mode function is automatically activated or suggestion to activate the tunnel mode function is given by voice command or display (step ST7). As a method of activating the tunnel mode function, there are some methods such as an automatic activation method (in view of safety considerations), manual activation method by operation of the manual tunnel switch 21 provided in the vehicle, and a method of suggesting activation of the tunnel mode function to the driver by audio-visual instruction.

On the other hand, if the determination result in step ST2 is "No", it is determined whether or not the vehicle will exit the tunnel soon (step ST8). When the answer is "No", the routine returns to the step ST1 and the operation as described above is repeated. When the answer is "Yes", it is determined from data read from the database whether or not a continuous tunnel exists (step ST9). If the answer is "Yes", the routine returns to the step ST3 and the tunnel characteristics are displayed. If the answer is "No", the routine performs the opposite operation to (1) to (5) above. That is to say:

(1) The state of the headlights is detected. When the state of the headlights is ON after the vehicle exits the tunnel, either the driver is advised to turn the headlights OFF or the headlight control means 18 is activated to automatically turn the headlights OFF. Further, the brightness of the headlights and beam height as well as the color tone of the display are returned to the previous state.

(2) The state of the windows is detected and when the windows are in a closed position, the window operation means 17 is activated to open the windows if necessary.

(3) The state of the sunroof is detected and when the sunroof is in a closed position, the sunroof operation means 19 is activated to open the sunroof, if necessary.

(4) The state of the internal/external air recirculation is detected and when internal air recirculation is performed after exiting the tunnel, the user is advised to switch to external air recirculation mode or the air-conditioning switch means 17 is activated to automatically switch the air-conditioning system to external air recirculation mode.

In addition, (5) Radio or TV stations which can normally be received are displayed so that the driver can perform tuning. Otherwise, the tuning may be automatically performed.

Next, it is determined whether the vehicle is in the tunnel mode function (step ST10). If the result of the determination is "No", no action is taken (step ST11). If the result of the determination is "Yes", the tunnel mode function is automatically deactivated or suggestion to deactivate the tunnel mode function is given by voice command or display (step ST12). Deactivation of the tunnel mode function is effected in the same manner as activation of the tunnel mode function as discussed above, the on-vehicle devices are returned to the state immediately before activating the tunnel mode function.

Instead of or simultaneously with the display on a display means 16 as in the first embodiment of the present invention discussed above, suggestion to the driver may be given by voice commands.

For example, "there is a 300 m tunnel ahead", or "the road slopes downwardly in the tunnel", or "there are two continuous tunnels" may be given as the voice commands.

Unnecessary tunnel guiding can be prevented by performing a determination as to whether the tunnel mode function should be activated, based on the distance to the tunnel and the vehicle speed.

For example, when the length of the instant tunnel is 50 m, if the average speed of the vehicle is 50 km/h, the tunnel will be passed in several seconds. Thus, it is not necessary to activate the tunnel mode function. However, when the average vehicle speed is 0–2 km/h due to traffic congestion or the like, several minutes will be required to pass the tunnel and thus the tunnel mode function should be activated.

However, with respect to particularly important information (for example, the presence of a curve in the tunnel), it is preferred that display or suggestion should be performed as frequently as possible.

As described above, according to the first embodiment of the present invention, when a vehicle approaches a tunnel, tunnel characteristics such as, for example, the name of the tunnel, the shape of the tunnel (height, width, length, presence of curves), the lane number in the tunnel, the presence of a plurality of tunnels in a short distance (hereafter this is termed "continuous tunnel", that is to say, when there is a single short tunnel, the possibility exists that it is not necessary to switch to the tunnel mode function, but when a plurality of tunnels continues, it will be often the case that the device should be switched to the tunnel mode function), the presence of traffic lights in the tunnel or the like are displayed. A longitudinal cross section of the tunnel 22 in the direction of travel is also displayed. Thus, precautions can be supplied to a driver. In addition, sudden information related to traffic congestion or the presence of traffic restrictions are displayed on the display means. Thus, driving safety and comfort are increased due to the extra time allowed for the driver to determine necessary action required in a tunnel which will be travel through.

INDUSTRIAL APPLICABILITY

As shown above, the navigation device according to the present invention is adapted to indicate tunnel conditions in a tunnel which will be travelled through to the driver beforehand by indication of the tunnel characteristics when the vehicle approaches the tunnel on a travel route is approaching, and thus to increase driving safety and comfort due to the extra time allowed for driving.

What is claimed is:

1. A navigation device comprising:
   a vehicle position detection means for detecting a vehicle position;
   a vehicle speed detection means for detecting a vehicle speed;
   a determination means having a database which stores characteristic data relating to tunnels on a route network and data on a currently traveled route network and the surroundings thereof, said determination means determining whether or not to activate a tunnel mode function based on said characteristic data relating to the tunnel read from said database, the vehicle speed detected by said vehicle speed detection means and the vehicle position detected by said vehicle position detection means; and
   a control means adapted to inform a driver of characteristics of the tunnel to be travelled through on the basis of a command signal from said determination means indicative of activation of the tunnel mode function, said control means operating various on-vehicle devices in the tunnel mode function or suggesting activation of the tunnel mode function.

2. The navigation device according to claim 1, further comprising:
   a display displaying a tunnel map when the tunnel mode function is activated.

3. The navigation device according to claim 1, further comprising:
   a display displaying information on the characteristics of the tunnel.

4. The navigation device according to claim 1, wherein said determination means determines whether or not a tunnel mode function should be activated based on a tunnel length and an average vehicle speed before entering the tunnel.

5. A navigation device adapted to calculate proximity of a vehicle relative to a tunnel based on vehicle speed detected by a vehicle speed detection means when the vehicle lies within a link area in map data on which the tunnel exists, and to display information on characteristics of the tunnel, through which the vehicle will travel, on a display section of a navigation means when the proximity is within a fixed value.

6. The navigation device according to claim 4, wherein said device determines whether or not a tunnel mode function should be activated based on a tunnel length and an average vehicle speed before entering the tunnel.

7. A method for navigating a vehicle comprising:
   detecting a vehicle position;
   detecting a vehicle speed;
   storing characteristic data related to one or more tunnels on a route network and data on a currently traveled route network and a surrounding area thereto;
   determining whether a tunnel mode function associated with a vehicle should be activated based on the stored characteristic data, the detected vehicle position, and the detected vehicle speed; and
   outputting the characteristics of an impending tunnel when said determining step determines that said tunnel mode function should be activated and automatically operating one or more on-vehicle devices in accordance with said tunnel mode function or outputting a suggestion to activate the tunnel mode function.

8. The method according to claim 7, further comprising the step of displaying a tunnel map on the navigation device when the tunnel mode function is activated.

9. The method according to claim 7, further comprising the step of displaying information on one or more characteristics of the impending tunnel when the tunnel mode function is activated.

10. The method according to claim 7, wherein the step of outputting the characteristics of the impending tunnel is selectively performed based on a length of the impending tunnel and an average vehicle speed before entering the impending tunnel.

11. A method for navigating a vehicle comprising:
    detecting that the vehicle lies within a link area of map data containing information associated with an impending tunnel;
    calculating proximity of the vehicle relative to the impending tunnel based on detected vehicle speed; and
    outputting information associated with one or more characteristics of the impending tunnel when the calculated proximity is less than or equal to a determined value.

12. The method according to claim 11, wherein the step of outputting information is performed based on the length of the impending tunnel and an average vehicle speed before entering the impending tunnel.

* * * * *